July 13, 1965   B. COE   3,194,297
METHOD AND APPARATUS FOR FILM DRYING OF VISCOUS COMPOSITIONS
Filed Sept. 17, 1962   3 Sheets-Sheet 1
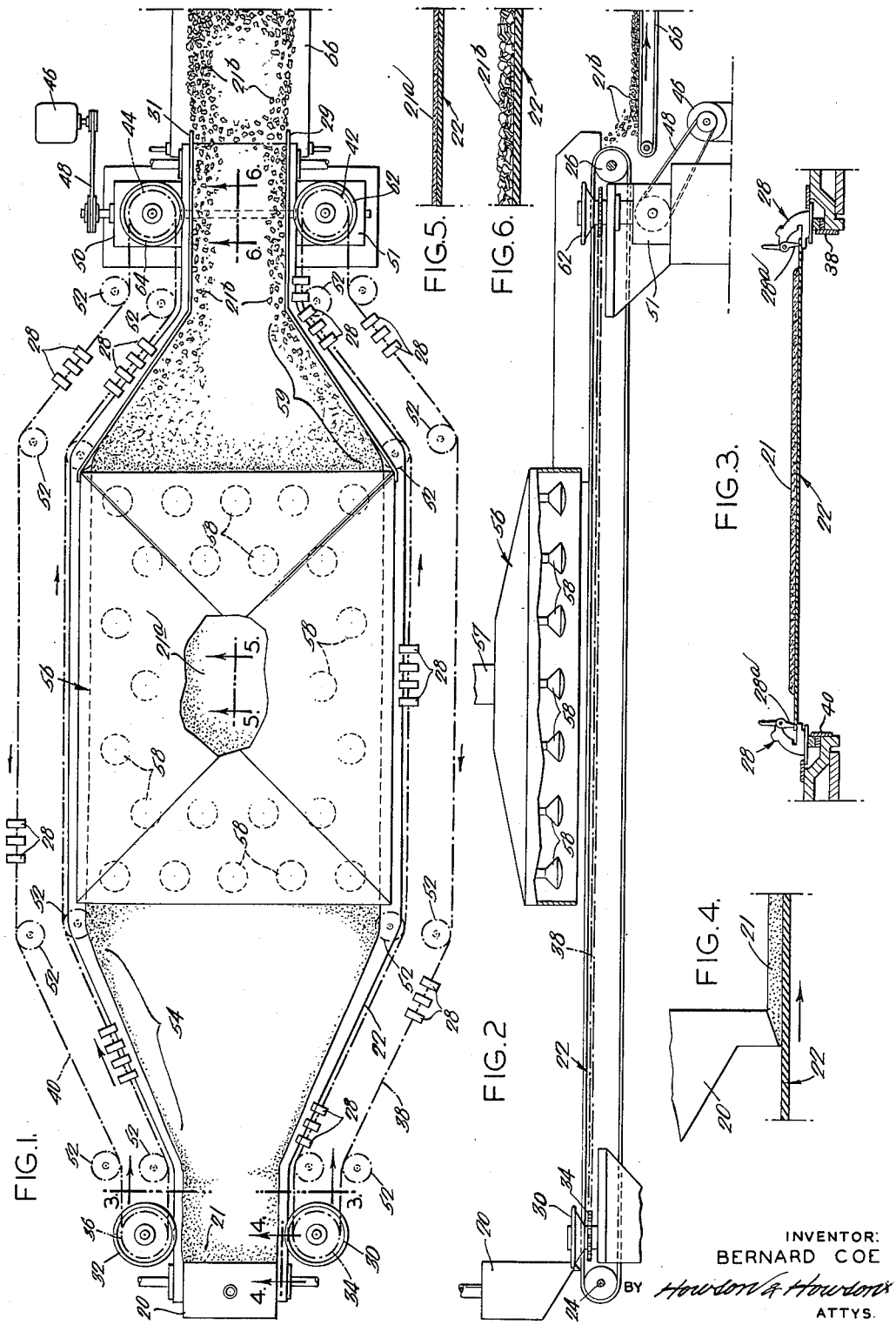
INVENTOR:
BERNARD COE
BY Howson & Howson
ATTYS.

July 13, 1965  B. COE  3,194,297
METHOD AND APPARATUS FOR FILM DRYING OF VISCOUS COMPOSITIONS
Filed Sept. 17, 1962  3 Sheets-Sheet 2
FIG.8.
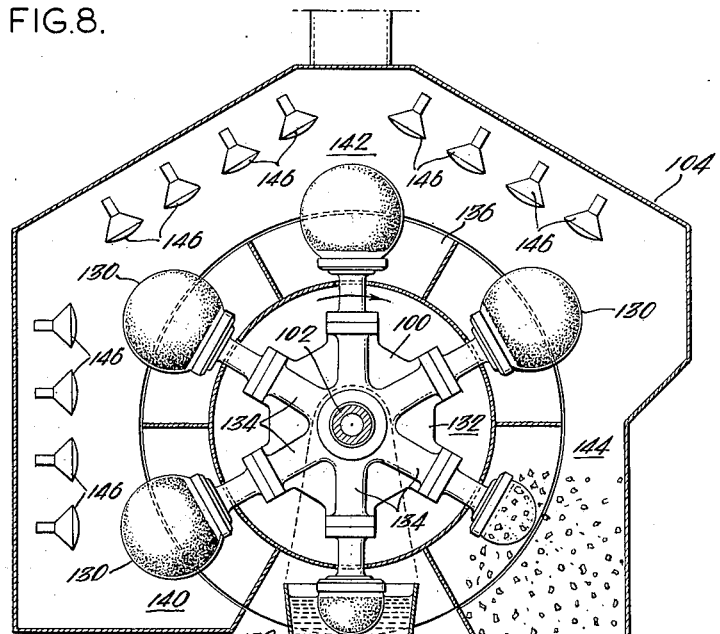
FIG.7.
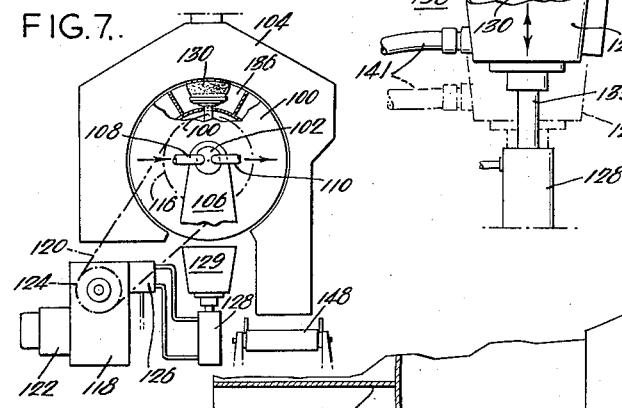
FIG.9.
INVENTOR:
BERNARD COE
BY Howson & Howson
ATTYS.

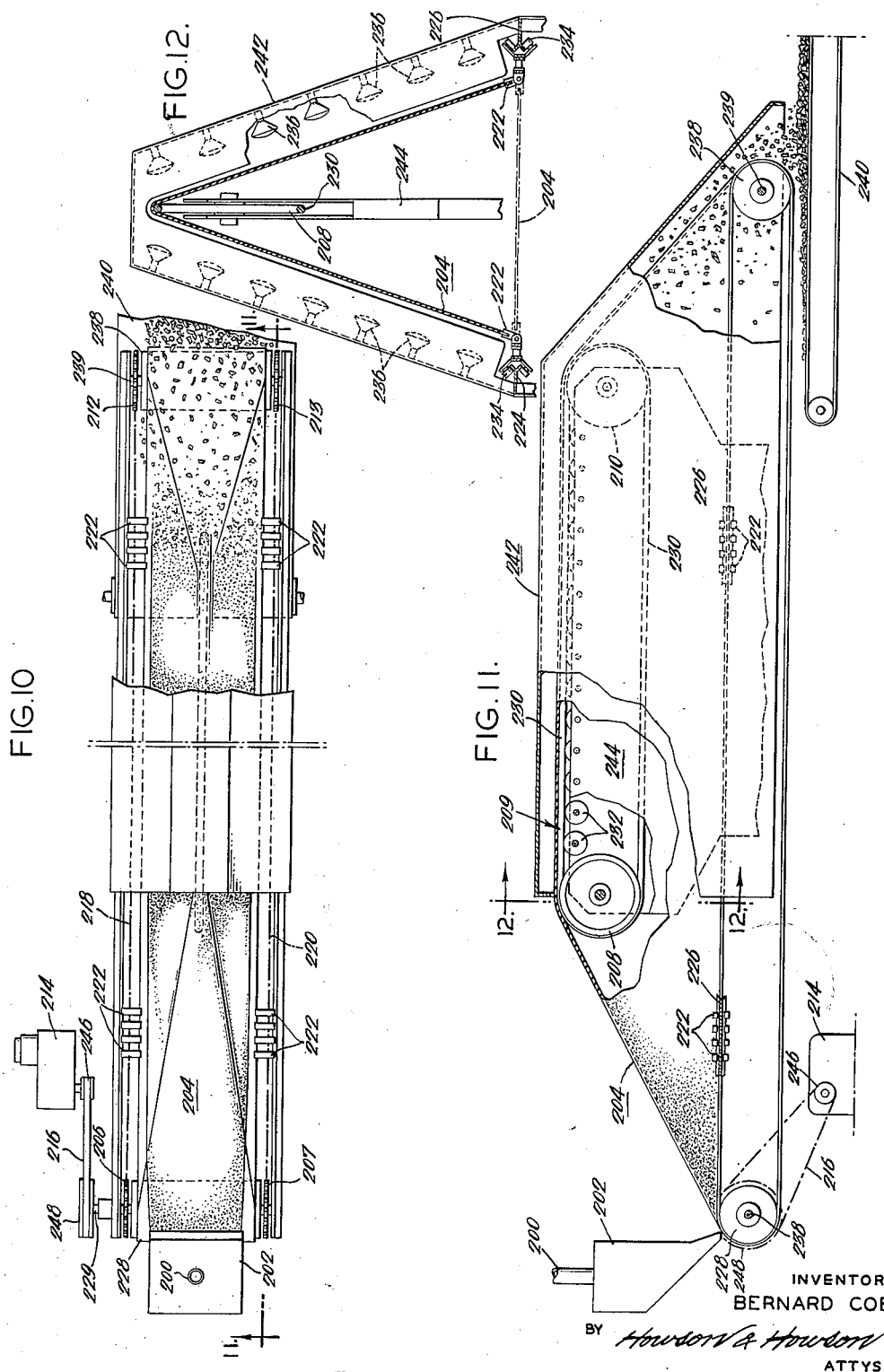

United States Patent Office 3,194,297
Patented July 13, 1965

3,194,297
METHOD AND APPARATUS FOR FILM DRYING OF VISCOUS COMPOSITIONS
Bernard Coe, Cinnaminson Township, Burlington County, N.J., assignor to Alco Chemical Corporation, Philadelphia, Pa., a corporation of Ohio
Filed Sept. 17, 1962, Ser. No. 224,059
27 Claims. (Cl. 159—7)

This invention relates to a method and apparatus for drying viscous fluid compositions containing a normally solid material, and more particularly the invention relates to a novel method and apparatus for drying such viscous fluid compositions quickly and effectively with a minimum application of high temperatures.

It is well known that thin layers of normally solid materials dispersed or dissolved in a volatile liquid will be dried more quickly by heat than will thick layers of a similar composition. The reason for this is that thin layers, in contrast to thick layers, provide a larger surface area per unit volume and, therefore, allow a more rapid escape of the volatile liquid as it passes from the liquid to the gaseous state by the application of heat. Therefore, it is not uncommon today for commercial drying processes and apparatus to employ some form of thin film or small droplet principle in drying various materials.

Generally a thin film is readily obtainable if the viscosity of the wet product allows fluid flow. However, as the viscosity of the fluid material increases, the flow is correspondingly reduced and it is therefore necessary to exert an external force on the fluid material to obtain a thin film, e.g. centrifugal force. Other means of obtaining a thin film such as scraping with a blade and the like have also been used.

However, highly viscous compositions such as pastes, jellies, etc., do not readily lend themselves to the application of such external forces. A thin film of these compositions can be obtained by dilution with various volatile liquid diluents. Adding such a volatile diluent to the viscous composition in the large volumes necessary to obtain the necessary fluidity complicates the drying process by increasing the drying load and handling requirements; resulting in more heat input per unit weight of solid and an overall less commercially attractive process.

A further disadvantage in diluting viscous compositions is that such diluted compositions are frequently subjected to temperatures well in excess of the boiling point of the volatile liquid portion thereof for substantial periods of time in order to achieve complete and efficient drying. Many substances, particularly organic polymers, are adversely affected by exposure to high temperature for such prolonged periods of time, and degradation of some polymers may take place.

A further difficulty encountered in thin film drying processes is that upon drying the film frequently has the tendency to adhere or stick to the drying surface and must be mechanically removed from the drying surface, for example by scraping or chipping. Various pretreatments of the drying surface, such as plating and the like, with certain metals, have been resorted to to minimize the sticking problem. However, thus far such pretreatments, which are relatively expensive, have achieved only limited success in the drying of many substances. Therefore, the removal of a dried film from a drying surface quickly and cleanly without resorting to extensive pretreatment of the drying surface and without resorting to extensive and unwieldy removal procedures has heretofore not been successfully accomplished with many materials.

Another problem encountered in thin film drying has been the overheating of the dried film caused in part by delay in removing the film from the drying surface. That is, the heat remaining in the drying surface after the drying operation has been completed often is sufficient to overheat and adversely affect the difficulty removable thin film which has been formed on the drying surface. This excessive heating adversely affects the desirable characteristics of the dried material, often rendering it relatively useless for the purpose for which it is subsequently intended.

The handling of the dried thin film material upon removal from the drying surface oftentimes heretofore has posed some difficulty. In the past for example, with many materials it has been found that the relatively thin film formed upon drying broke, buckled and rolled or folded over itself, thereby accumulating on the drying surface and disrupting removal techniques. Moreover, subsequent to the removal of the film from the supporting surface, it has often been necessary to subject the film to some mechanical sizing or breaking action whereby the required size of the dried particles is obtained.

Although methods other than film drying are known in the art, for example, such methods as spray drying, pan drying and the like, these methods do not readily lend themselves to drying more viscous compositions due to certain difficulties encountered in pumping, spreading, uniform heating, etc.

Various metals and alloys are used in the industry today as the drying surface. However, upon contact of the composition to be dried with certain metal drying surfaces, numerous unsatisfactory results are obtained. For example, with some materials it has been found that certain hot metals often act as catalysts under the heating conditions of the drying process to produce undesirable chemical reactions with the materials being dried. Further, the purity of the final dried product is often unsatisfactory, e.g., contamination resulting from metallic particles being leached from the metal drying surface is often encountered.

A principal object of the invention is to provide a novel method and apparatus for drying highly viscous fluid compositions containing a normally solid material whereby a thin film of the viscous composition is obtained without resorting to conventional external forces or dilution, and the thus formed thin film is dried and readily removed from the drying surface while avoiding pretreatment of said drying surface.

Another object of the invention is to provide a novel drying method and apparatus whereby overheating of the film of dried material resulting in detrimental changes to certain desirable characteristics of the dried material are avoided.

A further object of the invention is to provide a method for efficiently forming thin films of highly viscous fluid compositions in a rapid and efficient manner whereby the thickness of the film can be effectively controlled.

Still another object of the present invention is to provide a method and apparatus for drying highly viscous compositions containing a normally solid material by forming a thin film thereof on an expandable, resilient surface, and subsequently discharging the thin film from the supporting surface in an efficient and rapid manner whereby a particulate product of the desired particle size is obtained without resorting to complicated mechanical removing procedures or to subsequent mechanical particle sizing processes.

A still further object of the invention is to provide a novel process and apparatus whereby highly viscous compositions are efficiently dried in the form of a film and the dried solids are readily discharged from the film supporting surface in such a manner that degradation of the dried product by exposure to high temperatures for prolonged periods is avoided.

A particular object of the invention is to provide a novel method and apparatus for drying highly viscous compositions containing a normally solid material wherein the composition to be dried is contacted with a resilient, non-metallic drying surface and a high degree of purity of the dried product is maintained.

These and other objects of this invention and the various features and details of the method thereof and of the construction and operation of drying apparatus thereof, are more fully set forth hereinafter with reference to the accompanying drawings wherein:

FIGURE 1 is a plan view of drying apparatus illustrating one embodiment of the present invention;

FIGURE 2 is a side elevational view, partly in section, of the apparatus set forth in FIGURE 1;

FIGURE 3 is a cross-sectional view taken along the line 3—3 of FIGURE 1;

FIGURE 4 is a sectional, side elevation view taken along the line 4—4 of FIGURE 1;

FIGURE 5 is a cross-sectional view taken along the line 5—5 of FIGURE 1;

FIGURE 6 is a cross-sectional view taken along the line 6—6 of FIGURE 1;

FIGURE 7 is a schematic and elevational view of a second embodiment of the invention;

FIGURE 8 is an enlarged typical vertical section through the apparatus of FIGURE 7;

FIGURE 9 is an enlarged fragmentary view of one of the elements illustrated in FIGURE 8;

FIGURE 10 is a plan view, partly in section, of a third embodiment of the invention;

FIGURE 11 is a side elevational view, partly in section, taken along the line 11—11 of FIGURE 10, and FIGURE 12 is an end elevational view taken along the line 12—12 of FIGURE 11.

It is understood that the embodiments shown and described herein are for illustrative purposes and may be changed or modified without departing from the spirt and scope of the invention as set forth in the accompanying claims.

It has been discovered that highly viscous fluid compositions containing a normally solid material and a volatile liquid may be formed into thin films, the volatile liquid removed, and subsequently the resulting dried solids readily released from a drying surface, when said viscous fluid composition is applied as a layer to an expandable, resilient supporting surface, the supporting surface is thereafter expanded in area, the volatile liquid removed, and the supporting surface is then contracted. A thin film of the viscous fluid composition is formed from the thicker film applied to the supporting surface by applying extending or stretching forces to the expandable supporting means. Typical examples of expandable supporting means are an elastic endless belt which can be stretched to increase its surface area by applying lateral and/or longitudinal extending forces, and an elastic bladder or diaphragm which can be expanded in surface area by means of inflation with a gas or liquid.

By means of the invention the viscous fluid composition to be dried, in the form of a layer, adheres to the support means which is in a relatively relaxed condition as compared to its expanded condition, i.e. the expandable support can be in a completely relaxed condition at the time of applying the viscous composition thereto, or in a partly expanded state. The viscous material may then be expanded to several and even many times its surface area at the time the viscous composition is applied by applying expanding forces to the support means. To a large degree the thickness of the film after expansion of the support will determine the rate of drying, thin films drying more rapidly than thick films for any given material and drying system.

Drying can be subsequently accomplished by applying heat to the resulting thin film, heating means such as infrared and hot gases being preferred. Moreover, when inflatable type expandable supporting means are employed, it is understood that the inflating medium, whether gas or liquid can be heated to provide some or all of the heat necessary to dry the viscous composition.

After the film has been dried by removal of the volatile liquid, the support means can be reduced in surface area by releasing or reducing the expanding forces, for example by withdrawing all or a portion of the pressurized gas or liquid, or by reducing the mechanical tension imposed on the expandable support means.

The contraction forces produced by reducing the expanding forces from the supporting means are sufficient to overcome the adhesive force between the dried viscous film and the supporting means. Therefore, the dry, thin film of normally solid material is readily released from the supporting means. If the normally solid material is friable, it will be released in the form of chips or flakes. On the other hand, if it is somewhat flexible, it may be released in the form of a sheet.

The thickness and size of the dried film are a function of the surface area increase of the expandable supporting means, the thickness of the wet film prior to expansion of the supporting means, and also the manner in which the expanded supporting means is allowed to contract. When the expandable supporting means is stretched sufficiently to convert the relatively thick layer of viscous composition to a thin film, the size of the dried particles produced, if the dried material is friable, can be effectively controlled by the rate at which the expanded supporting means is contracted. A substantially instantaneous contraction of the supporting means, for example, results in the thin dried film being released with almost explosive force in the form of finely divided particles. Whereas, if the expanding forces on the support are released gradually, larger particles are obtained.

Therefore, it can be seen that the instant invention provides a novel method for drying various viscous fluid compositions containing a normally solid material which comprises applying a layer of a viscous fluid composition comprising normally solid material and a volatile liquid to an expandable, resilient, supporting surface, expanding said supporting surface to reduce the thickness of said layer of viscous fluid composition, removing volatile liquid to render said material in a substantially dry condition, and separating said substantially dry material from said supporting surface by contracting said surface.

The expandable, resilient support means for use in this invention can be made from numerous resilient materials having the properties of natural, reclaimed, vulcanized or synthetic rubber. It is preferred that the support material be expanded to at least about 400% of its original surface area and preferably from about 800 to about 1000% of its original surface area. A typical rubber having this property of expandability is vulcanized natural rubber. It is particularly desirable that the material when expanded, be capable of recovering rapidly to its original dimensions upon the release of expanding forces applied thereto. As mentioned above, various rubbers and elastomers, hereinafter called "rubber," such as natural and synthetic rubbers and plastic materials can be employed. The term "rubber" as employed in the specification and claims means any material regardless of its chemical composition that possesses mechanical properties similar to the special properties of natural rubber, that is, high deformability and extendibility with rapid recovery from deformation, good mechanical strength and the like.

Thus, a suitable rubber may consist of natural rubber or a synthetic rubber. Synthetic rubbers produced by:

(a) Polymerization of butadiene alone or with styrene
(b) Interaction between sodium polysulfides and dihalides
(c) Polymerization of chloroprene
(d) Polymerization of isobutylene, and
(e) Polymerization and plasticization of vinyl chloride can be used.

Other rubber or rubber-like materials which are suitable for use as the expandable supporting means of this invention include elastothiomers, polyacrylates, polyesters, silicones and polymers in which a variety of ester, amide and urethane linkages occur. Suitable acrylic rubbers, silicone rubbers and polyester rubbers may also be employed.

It is preferred that the expandable supporting means be comprised of those materials which have a high favorable elasticity, i.e., those materials which readily resume their original dimensions after removal of the force or forces which have produced an increase in dimensions, and which maintain their elastic integrity over an extended period of use. It is further preferred that those expandable materials which have relatively high rates of recovery of original dimensions be employed. A typical expandable material having these properties is vulcanized natural rubber.

It is readily apparent from the foregoing that various compositions containing a normally solid material and a volatile liquid, whether in the form of a solution, dispersion, paste, jelly or otherwise may be dried according to this invention. Of course, the use of the invention is particularly advantageous in the drying of relatively viscous compositions of the type which have been found to be difficult to form into thin films according to prior known methods. In addition, this invention finds use in promoting chemical reactions wherein a solid product in dry form is desired. For example, where the reaction produces a solid product and a liquid by-product, such as water, the invention can be used to dry the product and to drive the reaction to completion by removal of the liquid by-product. A typical reaction where the invention may be used to advantage is in the production of condensation products of alkylated aldehydes with phenols as described in U.S. Patent No. 2,932,671. In the condensation reaction of this patent, liquid reactants are reacted to form the solid condensate and by-product water. According to the method of this invention the water may be removed and the condensate dried to obtain a substantially dry product in high yield. The expression "fluid composition containing a normally solid material" as used in this specification and claims is intended to include compositions where the solid to be dried is formed during drying as would be the case in carrying out the condensation reaction of the above-mentioned patent utilizing the drying method of this invention.

The normally solid material may be relatively brittle and friable when dried or may be relatively flexible. In the case of friable materials, this invention will ordinarily produce a particulate solid product. Where the dried material is relatively flexible, a sheet of material may result. In either case, the dried material should be readily separable from the expandable supporting surface upon contraction of the supporting surface. Persons skilled in the art will not encounter any difficulty in selecting a proper supporting material for any particular solid to be dried to avoid any significant adhesion between the dried material and the expandable supporting means.

The composition to be dried is preferably applied as a layer to the elastic supporting means in the form of a solution, suspension, dispersion, slurry or the like. The composition to be dried should wet the expandable, resilient supporting means so that upon expansion of the surface area of the supporting means, the composition wetting the supporting means will also be extended, thereby being transformed into a thin film. The viscosity of the composition should be sufficiently high so that the composition will not run off of the supporting surface. Generally, the compositions to be dried should have a viscosity of at least about 300 centipoises (Brookfield viscometer at 20 r.p.m.) at 25° C. and preferably at least about 1000 centipoises. As used in this specification and claims, the expression "viscous fluid composition" means a composition having physical properties, such as viscosity, surface tension, the ability to wet the expandable supporting surface, etc., so as to be capable of being transformed into a thinner film on expansion of the supporting surface.

Solutions of water soluble resins such as polyacrylates, e.g. sodium polyacrylate and other alkaline metal salts of acrylic polymers and copolymers are readily adaptable to be dried by the herein described method and apparatus for drying. Other compositions which may be dried include solutions and dispersions of polymeric materials such as polyvinyl alcohol, various phenol formaldehyde condensation polymers, nitrogen containing polymers such as melamine formaldehyde condensation polymers and urea condensation polymers. In addition, sugar and salt solutions, and various natural gums and food products, either in solution or in suspension, can similarly be dried. Various suspensions and slurries of materials such as zinc dimethyldithiocarbamate, dispersions of fine particles such as those found in paints and various suspensions of pharmaceutical materials can also be dried according to the instant invention.

The advantages of this invention will be particularly apparent from the following discussion of the use thereof in obtaining sodium polyacrylate in the form of a dry powder. Sodium polyacrylate may be produced by an emulsion polymerization process wherein acrylonitrile is polymerized in the presence of a catalyst, and the resulting polymer is thereafter reacted with sodium hydroxide in the presence of water to produce the sodium salt of polyacrylic acid. This reaction composition comprises generally about 10% polyacrylate total solids, and is extremely viscous, having a viscosity of from 60,000 to 300,000 centipoises (Brookfield viscometer at 20 r.p.m.), at 25° C. Of course, handling sodium polyacrylate as a solid, dry product is much more attractive commercially than handling a bulky, viscous solution comprising on the order of 90% water. Conventional drying methods are not readily adaptable to drying an aqueous sodium polyacrylate solution due to high viscosity of the solution and the difficulties encountered in pumping, spreading and the like. Further, sodium polyacrylate adheres tenaciously to the drying surface upon evaporation of the liquid carrier and must be mechanically removed therefrom by chipping or the like. However, when sodium polyacrylate is dried according to the teachings of the instant invention, thin chips of the material are relatively easily produced efficiently, in a high degree of purity at relatively low expense.

With reference to the drawings:

FIGURES 1 to 6 illustrate apparatus according to one embodiment of this invention.

In FIGURE 1, a viscous fluid composition 21 to be dried is applied as a layer by means of feed hopper 20 to endless expandable support means 22 (see FIGURE 4). Support means 22 comprises an endless belt of rubber extending between rolls 24 and 26. Tenter clamps 28 engage the edges of support means 22 by means of engaging devices 30 and 32, respectively, which are mounted on sprockets 34 and 36 respectively. A series of these tenter clamps are mounted throughout drive chains 38 and 40 (see FIGURE 1). Drive sprockets 42 and 44 are driven by a motor 46, belt 48, and gear transmissions 50 and 51, respectively. A series of idler sprockets 52 serve to guide drive chains 38 and 40 and the tenter clamps affixed thereto between sprockets 34 and 42, and 36 and 44, respectively.

While tenter clamps 28 travel on guide chains 38 and 40 they are in a locked or closed position (see FIGURE 3) not only while engaging expandable support means 22 but also during their return from disengaging means 62 and 64 to engaging means 30 and 32 respectively. Therefore, prior to contacting engaging means 30 and 32 the tenter claimps 28 are in a closed position as shown in FIGURE 3. Upon contacting engaging means 30 and 32 the actuating arm 28a of tenter clamps 28 is actuated to an open position, i.e. the lower portion of the actuating arm 28a is pivoted inwardly toward the body of the tenter clamp 28 by contact of the upper portion of the actuating arm with engaging means 30 or 32, and thus is able to receive expandable support means 22. Upon engaging the expandable support means at engaging means 32 and 34, respectively, the tenter clamps 28 close, i.e. the lower portion of each actuating arm 28a pivots outwardly away from the body of the tenter clamp and engages the expandable support means, and then the tenter clamps pass from the engaging area through expanding zone 54 where a mechanical tension is applied to the edges of the expandable supporting means by a series of idler sprockets 52 on opposite sides of the expandable supporting means which guide the chains 38 and 40 to stretch the supporting means, thereby extending the supporting means to approximately three times its original width and also extending the supporting means longitudinally thereby forming composition 21 into a thin film as indicated by 21a (see FIGURE 5). The expanded supported means with film 21a adhered thereto passes into heating zone 56.

Heating zone 56 is provided with infrared heating means 58 which serve to dry thin film 21a by driving off any volatile liquid constituents thereof, the vapors being withdrawn from zone 56 by venting means 57. Alternatively, heating zone 56 may be provided with other types of heating means (not shown) such as hot air introduced by means of air jets and the like. After passing through heating zone 58 the expandable supporting means 22 with the dried thin film of solid material adhered thereto passes through contraction zone 59 wherein the expanded supporting means returns to its original dimensions.

Upon passing through contraction zone 59, the thus dried thin film is released from the elastic supporting means 22 in the form of separate particles or flakes 21b which are retained on the supporting means by guide rails 29 and 31 (see FIGURE 1). Tenter clamps 28 release the elastic support means 22 by releasing means 62 and 64, respectively which contact actuating arm 28a and open the tenter clamps thereby releasing support means 22. The thus formed chips of dried material fall off elastic support means 22 onto discharge conveyor means 66.

It is noted that when the dried material 21a passes out of drying zone 56, the adhesive forces between the dried material and the expandable supporting means 22 are overcome by the contraction forces produced in contraction zone 59 when the expanding forces are released and the expandable support means is allowed to return to its original dimensions.

FIGURES 7 to 9 illustrate a second embodiment of the invention wherein a plurality of expandable, resilient surfaces of generally spheroidal configuration are sequentially immersed in the viscous fluid composition to be dried and subsequently these surfaces are expanded by pneumatic means to form a thin film of the composition which is then dried. Upon contraction of the expandable surfaces, the dried material is released.

More particularly, a rotary turret or supporting means 100 is rotatably mounted on a hollow shaft 102 and enclosed in housing 104. Shaft 102 extends through the housing 104 and is supported on either end thereof by journal blocks 106. Connected to hollow shaft 102 are gas intake and outlet means 108 and 110, respectively. As illustrated in FIGURE 9, hollow shaft 102 is divided longitudinally by a divider plate 113 extending longitudinally of the shaft 102 into two chambers 112 and 114, which communicate with air inlet and outlet lines 108 and 110, respectively. Turret 100 is provided with intermittent rotational motion by means of driven sprocket 116 which is fixed to the turret head, said driven sprocket being connected to transmission means 118 by means of chain 120. Motor means 122, regulated by suitable timing mechanism, not shown, drives driving sprocket 124, intermittently through transmission 118. Transmission 118 also positive operates valve means contained in pneumatic control unit 126 which produces a hydraulic cyclic operation actuating hydraulic lift 128 when a spheroidal expandable surface is in registry with the container means 129 for the viscous composition. Therefore, in operation a deflated spheroidal expandable surface 130 is immersed in the viscous composition to be dried when the hydraulic lift 128 is moved from the retracted position (see the dotted lines, FIG. 8) to the extended position during the lull in the intermittent rotation of turret 100 when a spheroidal surface is in registry with the container 129.

Referring more particularly now to FIGURE 8, rotary turret 100 comprises hub portion or a central section 132 with a series of arms 134 extending radially therefrom. Arms 134 are fitted with inflatable, expandable, spheroidal surfaces or bladders 130 of rubber. Rotary turret 100 has a compartmented circular head 136 affixed thereto.

The apparatus is divided into a series of zones. There is an immersion zone 138, where container 129, secured to piston 139 of hydraulic lift 128 is located. Container 129 is provided with feed inlet means 141 for delivering viscous composition to container 129. Housing 104 is divided into expansion zone 140, drying zone 142 and contraction zone 144.

Each bladder 130 is coated sequentially with viscous composition in immersion zone 138 when container 129 is in the raised position. Subsequently container 129 is lowered and turret 100 is rotated clockwise with a coated bladder 130 being introduced into expansion zone 140 where it is expanded to the requisite size by being inflated with a suitable gas, which may be heated. Upon continued rotation the inflated bladder passes through heating zone 142 equipped with banks of infra red heaters 146.

The viscous composition coated on each deflated bladder 130 in immersion zone 138 is subsequently stretched to a thin film in expansion zone 140 and dried in heating zone 142. Upon contraction of each bladder in contraction zone 144, the thus dried thin film of material is released from the bladder and falls in particulate form from contraction zone 144 onto conveyor 148 (see FIGURE 7).

A more detailed illustration of the inflation and deflation means of this embodiment of the invention is set forth in FIGURE 9. Turret 100, carrying sleeve bearing 150, which rotates with the turret, is provided with orifices 151, and is mounted for rotation on stationary shaft 102. As described earlier, shaft 102 is partitioned into a high pressure side 112 and a low pressure side 114. Each arm 134 has a hollowed channel 152 extending through the length thereof. This hollow channel communicates with the high pressure side 112 of shaft 102 by means of inlet orifice 154 in shaft 102. Therefore, during passage through the expansion zone, air or other gas is forced from the high pressure side of shaft 102 through orifices 151 and into channel 152 of an arm 134 and out into a bladder 130, expanding said bladder by passing through perforations 156 contained in domed head 158.

As each spheroidal expandable surface passes through drying zone 142, it remains in an expanded state by reason of the presence of the inflating gas which is prevented from escaping by the seal formed between sleeve 150 and shaft 102. When each expandable surface reaches the contraction zone, the inflating gas is permitted to escape through channel 152, above orifice 151, and exhaust orifice 155 to low pressure side 114 of shaft 102 and then out through gas outlet means 110.

Upon contraction of each expandable surface, the dried material is separated therefrom, and if friable is discharged in the form of solid particles.

FIGURES 10, 11 and 12 illustrate a third embodiment of the instant invention. The composition to be dried is introduced by means of tube 200 to feed hopper 202 from which it is applied as a layer onto endless expandable rubber support means 204. Endless expandable rubber support means 204 is carried by drive roll 228 and driven roll 238. Drive roll 228 and sprockets 206 and 207 may be driven by any suitable means such as power transmission unit 214 and sheaves 246 and 248 which are interconnected by a suitable chain drive generally indicated at 216. The rolls 228 and 238 in turn are carried on shafts 229 and 239 respectively. To shafts 229 and 239 are also secured drive sprockets 206 and 207 and driven sprockets 212 and 213 respectively, which in turn receive the cleat elements 222, and serve to propel the cleat elements longitudinally while maintaining the side edges of the expandable support means 204 substantially parallel during its traverse through the apparatus. To this end suitable roller elements 234 secured to the chains 218 and 220 are engaged in guide rails or tracks 224 and 226. Cleat elements 222 are pivotally mounted on chains 218 and 220 with the outer edges of the chain 218 having roller bearings 234 mounted thereon, which bear on guide means 224 and 226.

Means is provided at 209 for expanding the central area of said support means 204 in a vertical plane to effect a thinning of the viscous fluid composition prior to entering drying chamber 242 provided with infrared heating elements 236. The expanded support means is maintained in an expanded state for the duration of the drying period. Expanding means 209 comprises freely rotatable sheaves 208 and 210 supporting an endless belt thereon indicated at 230. Idler support rolls for said belt during the upper run thereof are indicated generally at 232. Suitable support for expanding means 209 is generally indicated at 244. As the extendible support means passes from roller 228 to sheave 208 a significant extension of the surface of the elastic support means 204 is achieved. Upon reaching expanding means 209, expandable support means 204 is brought to bear upon sheaves 208 and 210 and belt 230 and extended thereby, idler rolls 232 providing additional support for the expandable support means during this period of expansion (see FIGURE 11). Thus, the flat expandable support means 204 is expanded into a tent-like structure as illustrated in FIGURE 12 while passing over the area defined by sheaves 208 and 210. Thus, the expandable support means 204 upon passing from roller 228 to sheave 208 is expanded laterally and longitudinally thereby increasing the total surface area of the support means and converts the layer of viscous composition to a relatively thin film. Upon passing from drying chamber 242 where volatile liquid is removed, the dried material is released from the expandable supporting means 204 by contraction thereof in the form of discrete solid particles which pass onto discharge conveyor means 240.

Although in the various embodiments of this invention as shown in the drawings and described in detail hereinabove the expandable supporting surface is relatively smooth surfaced; a pocketed surface wherein the pockets serve as a plurality of small traps for the liquid composition may also be used, particularly with lower viscosity fluids.

The following example of the method of this invention is given for the purpose of illustration only and is not intended to limit the scope of this invention in any way.

A composition comprising 10% sodium polyacrylate (less than 80% hydrolyzed) and 90% water having a viscosity of 180,000–200,000 centipoises (Brookfield viscometer at 20 r.p.m.) was applied to an inflatable rubber bladder to form a substantially continuous film about 1/16″ thick. The bladder was inflated and placed in a forced draft hot air oven maintained at a temperature of 85° C. The inflated bladder was removed from the oven after 15 minutes and the bladder was deflated. The sodium polyacrylate separated from the bladder in the form of delicate dry flakes which were easily moved by a current of air. Subsequent addition of the flakes to water showed they had not undergone any chemical alteration during drying.

Considerable modification is possible in the selection of the viscous fluid composition to be dried, the expandable supporting means employed, the method of removing volatile liquid from the viscous fluid composition, the apparatus employed and the conditions under which the drying process is operated without departing from the scope of the invention.

What is claimed is:

1. A method for drying a viscous fluid composition containing a normally solid material which comprises applying a viscous fluid composition comprising said normally solid material and a volatile liquid to an expandable, resilient supporting surface, expanding said supporting surface to reduce the thickness of said layer of viscous fluid composition, removing volatile liquid to render said material in a substantially dry condition, and separating said substantially dry material from said supporting surface by contracting said surface.

2. The method according to claim 1 in which said viscous fluid composition comprises a solution of said solid material in said volatile liquid.

3. The method according to claim 1 in which said viscous fluid composition comprises a dispersion of particles of said solid material in said volatile liquid.

4. The method according to claim 1 in which said viscous fluid composition has a viscosity of at least 300 centipoises at 25° C.

5. The method according to claim 1 in which said viscous fluid composition is in the form of a paste.

6. The method according to claim 1 in which said viscous fluid composition comprises a solution of a synthetic organic polymer in a volatile organic solvent.

7. The method according to claim 1 in which said viscous fluid composition comprises an aqueous dispersion of solid particles of a synthetic organic polymer.

8. The method according to claim 1 in which said volatile liquid is removed by applying heat to said layer of said viscous composition.

9. Drying apparatus comprising an expandable, resilient surface for supporting a layer of a viscous fluid composition comprising a normally solid material and a volatile liquid, means for depositing a layer of said viscous fluid composition on said expandable surface, means for increasing the surface area of said expandable surface to reduce the thickness of said layer of viscous fluid composition, means for removing said volatile liquid while said supporting surface is in an expanded condition, and means for contracting said expandable surface.

10. Drying apparatus according to claim 9 in which said expandable surface is substantially flat.

11. Drying apparatus according to claim 9 in which said means for removing said volatile liquid comprises means for heating said layer of viscous fluid composition.

12. Drying apparatus according to claim 9 in which said expandable surface comprises an elastomeric composition.

13. Drying apparatus according to claim 9 in which said expandable surface is substantially spheroidal.

14. Drying apparatus according to claim 13 in which said means for expanding and contracting said spheroidal surface comprises pneumatic means.

15. Drying apparatus comprising an endless belt of an expandable, resilient substance, means for advancing said endless belt, means for applying a layer of a viscous fluid composition comprising a normally solid material and a volatile liquid to the surface of said belt, means for increasing the transverse dimension of said endless belt after application of said layer of said viscous fluid composition thereby to decrease the thickness of said layer, means for heating said layer of viscous fluid composition while said belt is in an expanded condition, and means permitting said belt to contract to substantially its original transverse dimension to release said solid material from said belt.

16. Drying apparatus according to claim 15 in which said belt comprises rubber.

17. Drying apparatus comprising a plurality of substantially spheroidal surfaces of expandable, resilient material spaced about the periphery of rotatable supporting means for said spheroidal surfaces, container means for containing a viscous fluid composition comprising a normally solid material and a volatile liquid into which said spheroidal surfaces are immersed sequentially to acquire a coating of said viscous fluid composition, pneumatic means for increasing the dimensions of each spheroidal surface after passing through said container means and for subsequently decreasing the dimensions of said spheroidal surfaces prior to re-entering said container means to remove the material therefrom, and heating means for heating and drying said viscous fluid composition on said spheroidal surfaces while said spheroidal surfaces are of increased dimensions.

18. Drying apparatus according to claim 17 in which said spheroidal surfaces are formed of rubber.

19. A method for drying a viscous fluid composition containing a normally solid material consisting of the steps of supporting a belt having an expandable support surface for movement along a predetermined path, depositing a viscous fluid composition comprising said normally solid material and a volatile liquid on said support surface at a supply zone along said path, expanding said support surface at least transversely to the direction of movement thereof at an expansion zone downstream of said supply zone thereby to reduce the thickness of said layer of viscous fluid composition, removing volatile liquid to render said material in a substantially dry condition in a drying zone downstream of said expansion zone, and permitting said belt to contract at a contraction zone downstream of said drying zone to separate said substantially dry material from said support surface.

20. A method for drying a viscous fluid composition containing a normally solid material consisting of the steps of supporting a belt having an expandable support surface for movement along a predetermined path, depositing a viscous fluid composition comprising said normally solid material and a volatile liquid on said support surface at a supply zone along said path, engaging opposite side edge portions of said belt during movement along said path, engaging said belt approximately centrally thereof downstream of said supply zone to form a tent-like structure and expand said support surface thereby increasing at least the transverse dimension of said belt and reducing the thickness of said layer of viscous fluid composition, removing volatile liquid to render said material in a substantially dry condition and thereafter permitting contraction of said belt thereby to separate said substantially dry material from said support surface.

21. A method for drying a viscous fluid composition containing a normally solid material consisting of the steps of applying a viscous fluid composition comprising said normally solid material and a volatile liquid to the expandable peripheral support surface of an expandable balloon-like member, introducing a fluid under pressure into said balloon-like member to expand said support surface thereof thereby to reduce the thickness of said layer of viscous fluid composition applied to the outer peripheral surface thereof, removing the volatile liquid to render the material in a substantially dry condition, and releasing the fluid under pressure from the interior of said balloon-like member to contract the outer peripheral surface thereof thereby to separate said substantially dry material from said support surface.

22. A method for drying a viscous fluid composition containing a normally solid material consisting of the steps of moving in a circular path a plurality of balloon-like members each having an expandable outer peripheral support surface, applying a viscous fluid composition comprising said normally solid material and a volatile liquid to the expandable peripheral support surface of each balloon-like member at a supply zone along said path, introducing a fluid under pressure into said balloon-like member at an expansion zone along said path to expand said support surface thereby to reduce the thickness of said layer of viscous fluid composition applied to the outer peripheral surface thereof, removing the volatile liquid at a drying zone along said path to render the material in a substantially dry condition, and releasing said fluid under pressure from the interior of said balloon-like member to contract the outer peripheral surface thereof thereby to separate said substantially dry material from said support surface.

23. In a drying apparatus, at least one balloon-like member having an expandable exterior support surface, means for applying a layer of viscous fluid composition comprising a normally solid material and a volatile liquid to the support surface of said balloon-like member, means for expanding the outer peripheral surface of said balloon-like member after application of said viscous fluid composition thereto to decrease the thickness of said layer, means for heating and drying said layer of viscous fluid composition while said balloon-like member is in an expanded condition, and means permitting said balloon-like member to contract to release said solid material from said support surface.

24. Drying apparatus comprising a balloon-like member having an expandable outer peripheral support surface, means for actuating said balloon-like member in a continuous path, a container along said path for a viscous fluid composition comprising a normally solid material and a volatile liquid, means for effecting relative actuation of said container and said balloon-like member to immerse said balloon-like member into said viscous fluid composition to apply said composition to the outer peripheral support surface of said balloon-like member, means for expanding the peripheral surface of said balloon-like member after application of said fluid composition thereto, heating means along said path for heating and drying said fluid composition to form a substantially solid friable film of said composition on said expanded support surface during movement along a portion of said path and means along said path for contracting said support surface after heating of said fluid thereby to rupture said substantially dry film and to remove said substantially dried material therefrom in the form of flakes.

25. Drying apparatus comprising a plurality of balloon-like members each having expandable outer peripheral support surface, means for actuating said balloon-like members in a circular path, a container along said path for a viscous fluid composition comprising a normally solid material and a volatile liquid, means for effecting relative actuation of said container and said balloon-like member when a balloon-like member and said container are in registry to immerse said balloon-like member into said viscous fluid composition to apply a layer of said composition to the outer peripheral support surface of said balloon-like member, means for expanding the peripheral surface of said balloon-like member in an expansion zone after application of a layer of said fluid composition thereto, heating means along said path for heating and drying said fluid composition to form a substantially solid friable film of said composition on said expanded support surface during movement along a portion of said path and means along said path for contracting said support surface in a contraction zone after heating of said fluid thereby to rupture said substantially dry film and to remove said substantially dried material therefrom in the form of flakes.

26. Drying apparatus as claimed in claim 25 including a rotatably mounted turret having a hub portion and a plurality of hollow arms extending radially from said hub portion, each of said arms mounting a balloon-like member at its free end.

27. Drying apparatus as claimed in claim 26 including a stationary hollow shaft on which said turret rotates, said shaft divided longitudinally into an inlet chamber and an outlet chamber and having radially extending inlet and outlet orifices communicating respectively with said inlet and outlet chambers and means for supplying a fluid under pressure to said inlet chamber, whereby upon rotation of said turret relative to said shaft, each of said arms registering with said inlet orifice in said expansion zone to permit said pressure fluid to expand said member and registering with said outlet orifice to exhaust said pressure fluid to permit contraction of said member in said contraction zone.

References Cited by the Examiner

UNITED STATES PATENTS

| | | | |
|---|---|---|---|
| 600,676 | 3/98 | Menzie | 118—34 |
| 2,360,257 | 10/44 | Muller et al. | 34—39 X |
| 2,473,404 | 6/49 | Young. | |
| 2,548,909 | 4/51 | Ryden. | |
| 2,769,522 | 11/56 | Pfeiffer | 198—34 |
| 2,841,820 | 7/58 | Pfeiffer. | |
| 2,856,634 | 10/58 | Ames. | |
| 2,988,772 | 6/61 | Horn. | |

NORMAN YUDKOFF, *Primary Examiner.*

GEORGE D. MITCHELL, *Examiner.*